US012370511B2

(12) United States Patent
Shapiro et al.

(10) Patent No.: US 12,370,511 B2
(45) Date of Patent: Jul. 29, 2025

(54) LABORATORY SHAKER WITH SPILL CONTROL

(71) Applicants: Thermo Fisher Scientific (Asheville) LLC, Asheville, NC (US); Thermo Electron LED GmbH, Langenselbold (DE)

(72) Inventors: Victor Shapiro, Oceanside, CA (US); Martin Schwager, Sondershausen (DE)

(73) Assignees: Thermo Fisher Scientific (Asheville) LLC, Asheville, NC (US); Thermo Electron LED GmbH, Langenselbold (DE)

( * ) Notice: Subject to any disclaimer, the term of this patent is extended or adjusted under 35 U.S.C. 154(b) by 952 days.

(21) Appl. No.: 17/487,310

(22) Filed: Sep. 28, 2021

(65) Prior Publication Data

US 2022/0111340 A1 Apr. 14, 2022

Related U.S. Application Data

(60) Provisional application No. 63/089,170, filed on Oct. 8, 2020.

(51) Int. Cl.

| | |
|---|---|
| ***B01F 11/00*** | (2006.01) |
| ***B01F 31/20*** | (2022.01) |
| ***B01F 31/22*** | (2022.01) |
| ***B01L 9/00*** | (2006.01) |

(52) U.S. Cl.

CPC ............ *B01F 31/22* (2022.01); *B01F 31/201* (2022.01); *B01L 9/00* (2013.01)

(58) Field of Classification Search

CPC ..... B01F 31/22; B01F 31/201; B01F 2101/23

See application file for complete search history.

(56) References Cited

U.S. PATENT DOCUMENTS

| | | | |
|---|---|---|---|
| 4,523,855 | A | 6/1985 | Walker |
| 5,558,437 | A | 9/1996 | Rode |
| 8,287,180 | B2 | 10/2012 | Kolar et al. |

(Continued)

FOREIGN PATENT DOCUMENTS

| | | |
|---|---|---|
| DE | 914732 C | 7/1954 |

OTHER PUBLICATIONS

Newtry, Lab Incubator Shaker Speed 300rpm Scientific Incu-Shaker Shaking Incubator with Temperature and time Setting, (first available Aug. 18, 2016), Amazon.com, URL:<https://www.amazon.com/dp/B01KL7DQQG/> (Year: 2016).

(Continued)

*Primary Examiner* — Elizabeth Insler

(74) *Attorney, Agent, or Firm* — BakerHostetler

(57) ABSTRACT

A laboratory shaker is provided having a shaker platform and a shaker mechanism operatively connected to the shaker platform. The shaker mechanism is configured to oscillate the shaker platform and at least one liquid-containing vessel supported on the platform. A spill tray is located beneath the shaker platform that has at least one aperture extending through the spill tray. The at least one aperture is configured to permit the operative connection of the shaker mechanism to the shaker platform through the aperture, wherein the spill tray is configured to contain spilled liquid from the at least one liquid-containing vessel.

18 Claims, 14 Drawing Sheets

(56) References Cited

U.S. PATENT DOCUMENTS

| | | | | |
|---|---|---|---|---|
| 8,393,781 | B2 * | 3/2013 | Manera | B01F 35/20<br>366/112 |
| 8,550,696 | B2 * | 10/2013 | Ebers | B01F 31/22<br>366/209 |
| D707,843 | S | 6/2014 | Meziere | |
| 9,126,200 | B2 * | 9/2015 | Simmat | G01N 35/04 |
| D852,976 | S | 7/2019 | Newberg et al. | |
| D858,195 | S | 9/2019 | Lee | |
| D906,381 | S | 12/2020 | Jeffery et al. | |
| D914,231 | S | 3/2021 | Ong et al. | |
| D914,906 | S | 3/2021 | Klein et al. | |
| D922,144 | S | 6/2021 | McConnell et al. | |
| 2008/0056059 | A1 | 3/2008 | Manera et al. | |

OTHER PUBLICATIONS

Newtry, Lab Incubator Shaker Speed 250rpm Scientific Incu-Shaker Shaking Incubator with Temperature and time Setting 5-, (first available Sep. 5, 2019), Amazon.com, URL:<https://www.amazon.com/dp/B07XD945Q8/> (Year: 2019).

Thermo Fisher Scientific, “A New Standard for Reliability and Technical Innovation”, (printed Jul. 2019), Thermofisher.com, URL:< https://www.thermofisher.com/order/catalog/product/SK4000?SID=srch-srp-SK4000#/SK4000?SID=srch-srp-SK4000> (Year: 2019).

German Office Action dated in the German Patent Application No. 10 2021 126 136.8 dated Oct. 31, 2024, with English Translation.

* cited by examiner

LABORATORY SHAKER WITH SPILL CONTROL

CROSS REFERENCE TO RELATED APPLICATION

The present application claims the filing benefit of U.S. Provisional Application Ser. No. 63,089,170, filed Oct. 8, 2020, the disclosure of which is incorporated herein by reference in its entirety.

FIELD OF THE INVENTION

The present invention relates generally to laboratory shakers and, more particularly, to incubated shakers, including platform shakers and orbital shakers.

BACKGROUND OF THE INVENTION

Incubated shakers, also referred to as thermal shakers, are well-known in the art to provide an automated mechanism to mix or stir liquids in one or more vessels under predetermined heated or refrigerated conditions within an incubated shaking chamber. These liquids are often contained in beakers, flasks, and other vessels which are placed on a shaker platform that oscillates horizontally, commonly referred to as a platform shaker or, alternatively, moves in a circular shaker motion, commonly referred to as an orbital shaker. This rotation of the platform in an orbital shaker allows the platform to move in a circular movement such that any point on the platform shares a common radius of rotation. Through this rotation, the incubated orbital shaker is able to homogeneously stir or mix liquid in a plurality of vessels irrespective of their position on the platform.

Movement of the platform within the shaker is provided by a shaker mechanism that is designed to move the platform in a desired motion and at a desired speed. The shaker mechanism is typically supported in a lower portion of the shaker housing and is operatively connected to the shaker platform.

The shaker mechanism is typically controlled by a controller that receives various setting parameters of the shaking process from a user via a user interface. These setting parameters may include, for example, shaking speed (RPM), incubated shaking chamber temperature, and shaking duration.

Under certain circumstances, the stirred or mixed liquids may escape from one or more of the vessels during the oscillating or orbital motion within the shaker and land on portions of the interior of the shaker. This may include situations where liquid overflows from its vessel while oscillating or rotating on the shaker platform, from a vessel breaking or accidentally releasing from its clamp, or from mishandling of the vessel while the shaker platform is at rest.

Due to the nature of the liquids being handled, it is important that all spills are cleaned up in a timely and thorough manner to avoid potential contamination during the future use of the shaker. For example, in some shakers, liquid spills can make their way onto surfaces within the shaker housing containing crevices that make it difficult to ensure the spill is fully cleaned up. This issue may be compounded if the spilled liquid contaminates non-removable parts of the shaker, making it difficult to wipe out and clean the parts in a thorough manner.

Furthermore, a release of liquids into the environment within the shaker could allow for potential leakage into the mechanical and electrical aspects of the shaker, thereby introducing potential corrosion and subsequent reduction in the useful shaker lifespan.

Therefore, in light of the aforementioned issues, a need exists for a laboratory shaker that allows for efficient containment and removal of spilled liquids within the shaker.

SUMMARY OF THE INVENTION

The present invention overcomes the foregoing and other shortcomings and drawbacks of laboratory shakers heretofore known. While the invention will be discussed in connection with certain embodiments, it will be understood that the invention is not limited to these embodiments. On the contrary, the invention includes all alternatives, modifications, and equivalents as may be included within the spirit and scope of the invention.

According to one embodiment, a laboratory shaker is provided having a shaker platform and a shaker mechanism that is operatively connected to the shaker platform. The shaker mechanism is configured to oscillate the shaker platform and at least one liquid-containing vessel supported on the platform.

A principle aspect of the present invention is the provision of a spill tray located beneath the shaker platform that has at least one aperture extending through the spill tray. The at least one aperture is configured to permit the operative connection of the shaker mechanism to the shaker platform through the aperture, wherein the spill tray is configured to contain spilled liquid from the at least one liquid-containing vessel.

In one embodiment, the laboratory shaker is configured to oscillate in circular shaker motion, although other shaking movements of the shaker platform are contemplated as well.

The laboratory shaker may include an insulated shaker chamber, with the shaker platform and the spill tray each being located within the insulated shaker chamber.

In one embodiment, a platform support is operatively connected to the shaker mechanism, with the platform support being located beneath and operatively connected to the shaker platform.

In one embodiment, the platform support entirely overlies the at least one aperture extending through the spill tray during oscillating movement of the shaker platform. Alternatively, the platform support may at least partially overlie the at least one aperture extending through the spill tray during oscillating movement of the shaker platform.

The spill tray may be removable from the laboratory shaker so that the spill tray may be separately sanitized.

According to one embodiment, the spill tray includes a base collecting area configured to contain spilled liquid from the at least one liquid-containing vessel. In one embodiment, the spill tray may include a bottom wall defining the base collecting area and an upstanding boss formed in the bottom wall of the spill tray that has a top wall. The at least one aperture extends through the top wall of the upstanding boss, and the upstanding boss may be at least partially surrounded by the base collecting area.

In one embodiment, the upstanding boss includes a raised lip portion that defines the at least one aperture extending through the top wall of the upstanding boss.

Other objects, features and advantages of the present invention will be readily understood after reading the following detailed description together with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
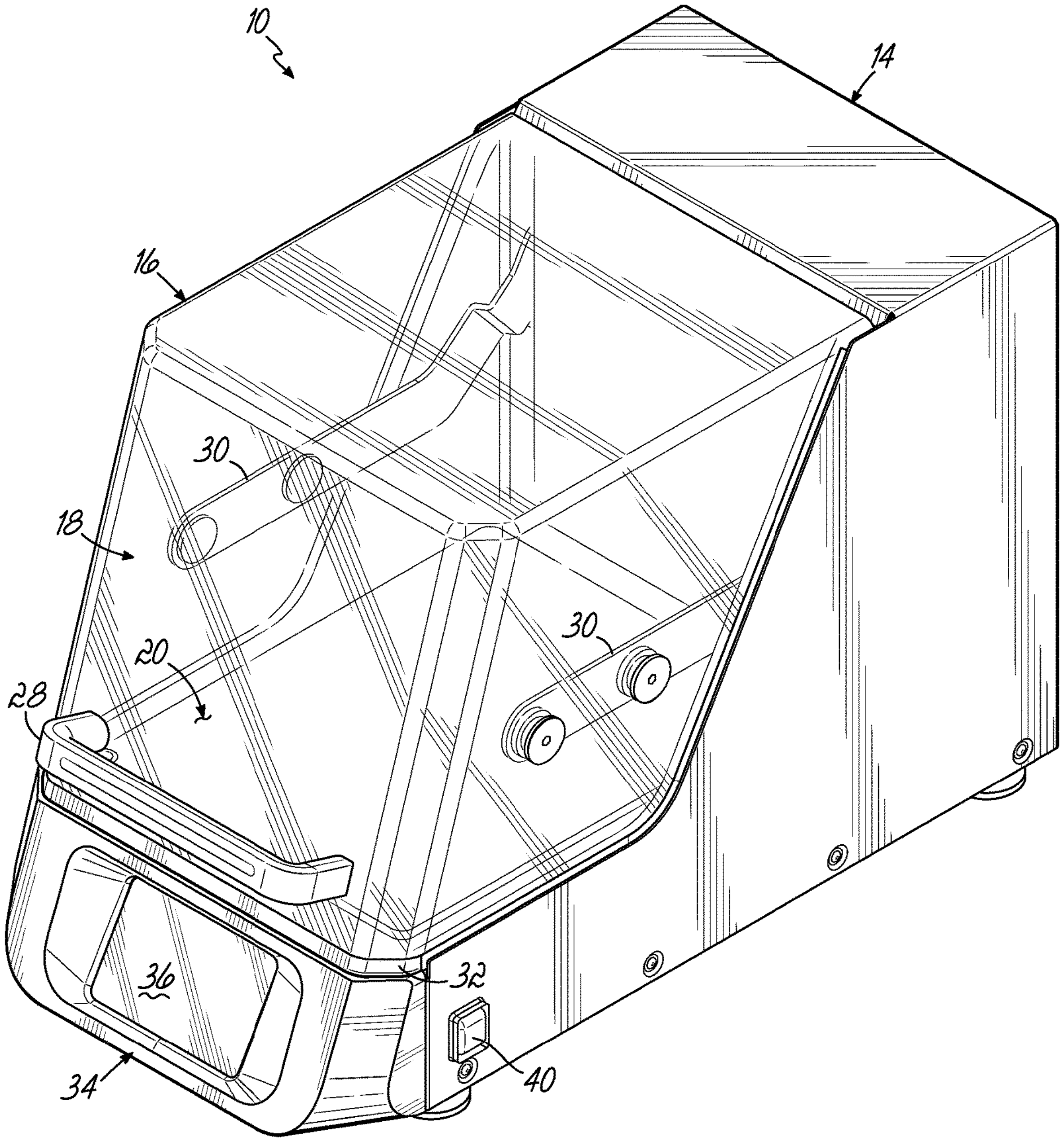
FIG. 1 is a perspective view of an incubated shaker according to one embodiment of the present invention, showing a pivotal cover of the shaker in a closed position.
Figure 2:
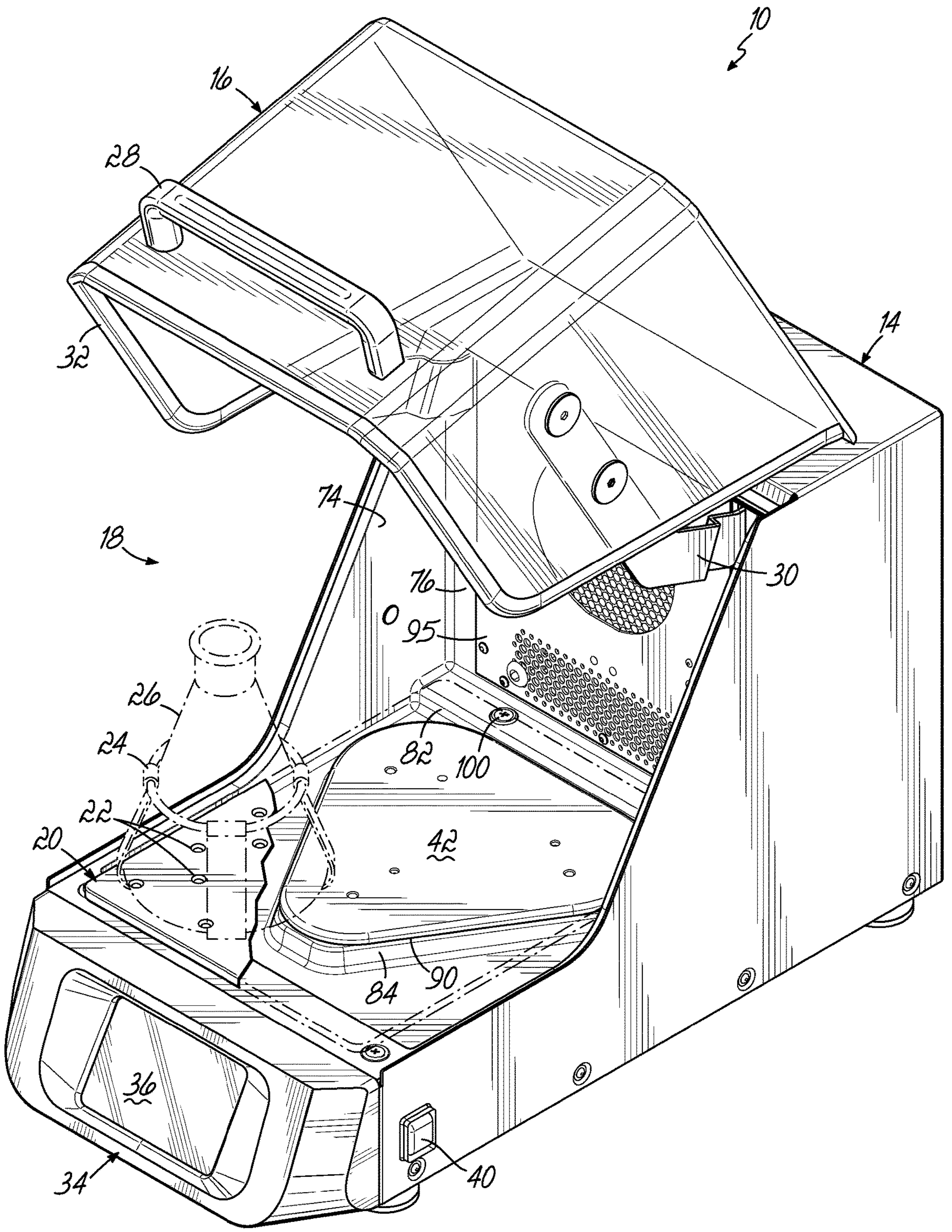
FIG. 2 is a perspective view similar to FIG. 1, showing the pivotal cover of the shaker in an open position with a partially broken away view of an orbital shaker platform located within an incubated shaker chamber of the shaker.
Figure 3:
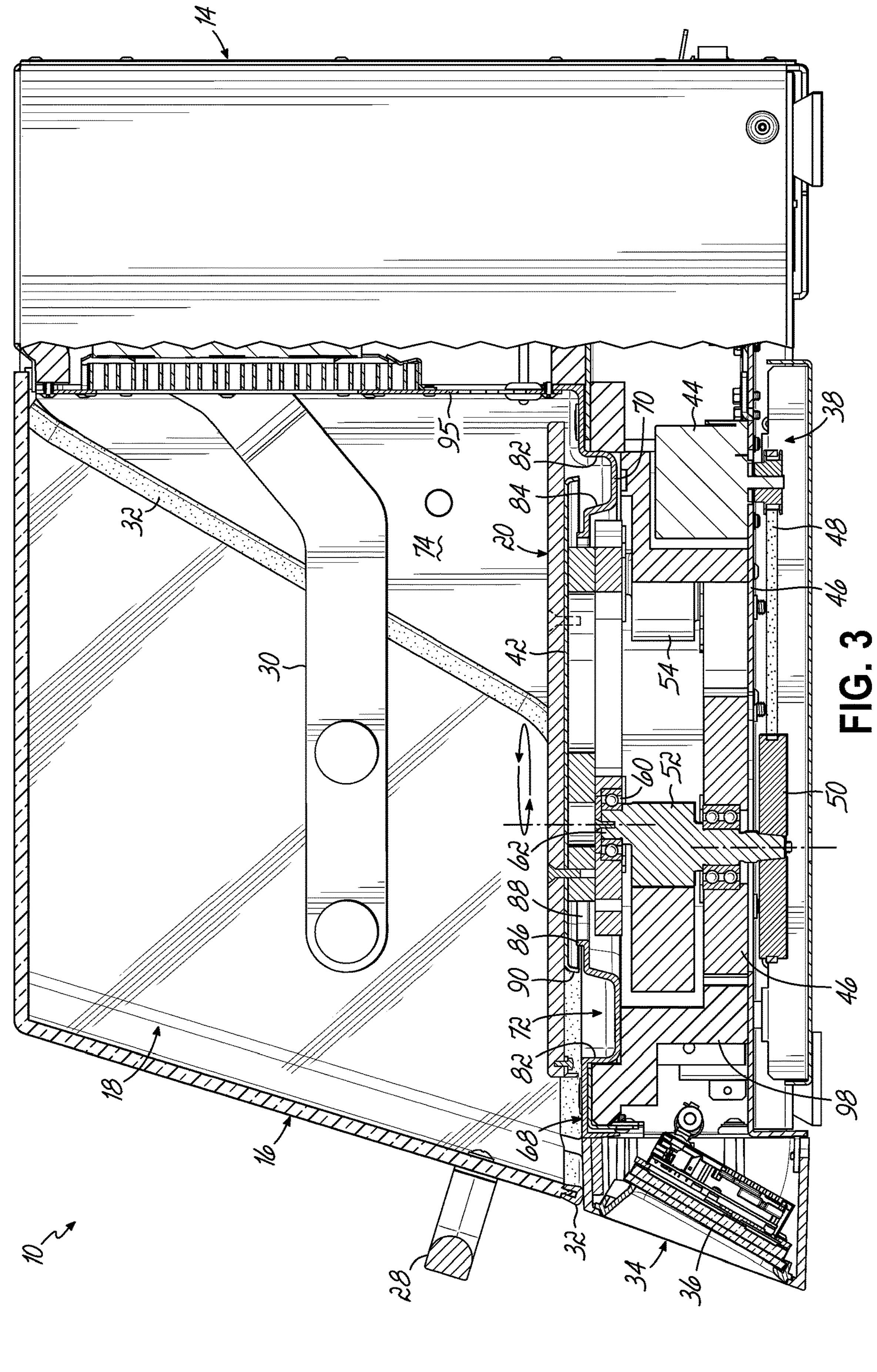
FIG. 3 is a longitudinal cross-sectional view of the incubated shaker shown in FIG. 1.

Referring now to the figures, and to FIGS. 1-4 in particular, an incubated shaker 10 is shown according to one embodiment of the present invention. The exemplary shaker 10 includes a housing assembly 14 and a pivotal cover 16 which is movable relative to the housing assembly 14 between an open position as shown in FIG. 2 and a closed position as shown in FIGS. 1 and 3.

Figure 9:
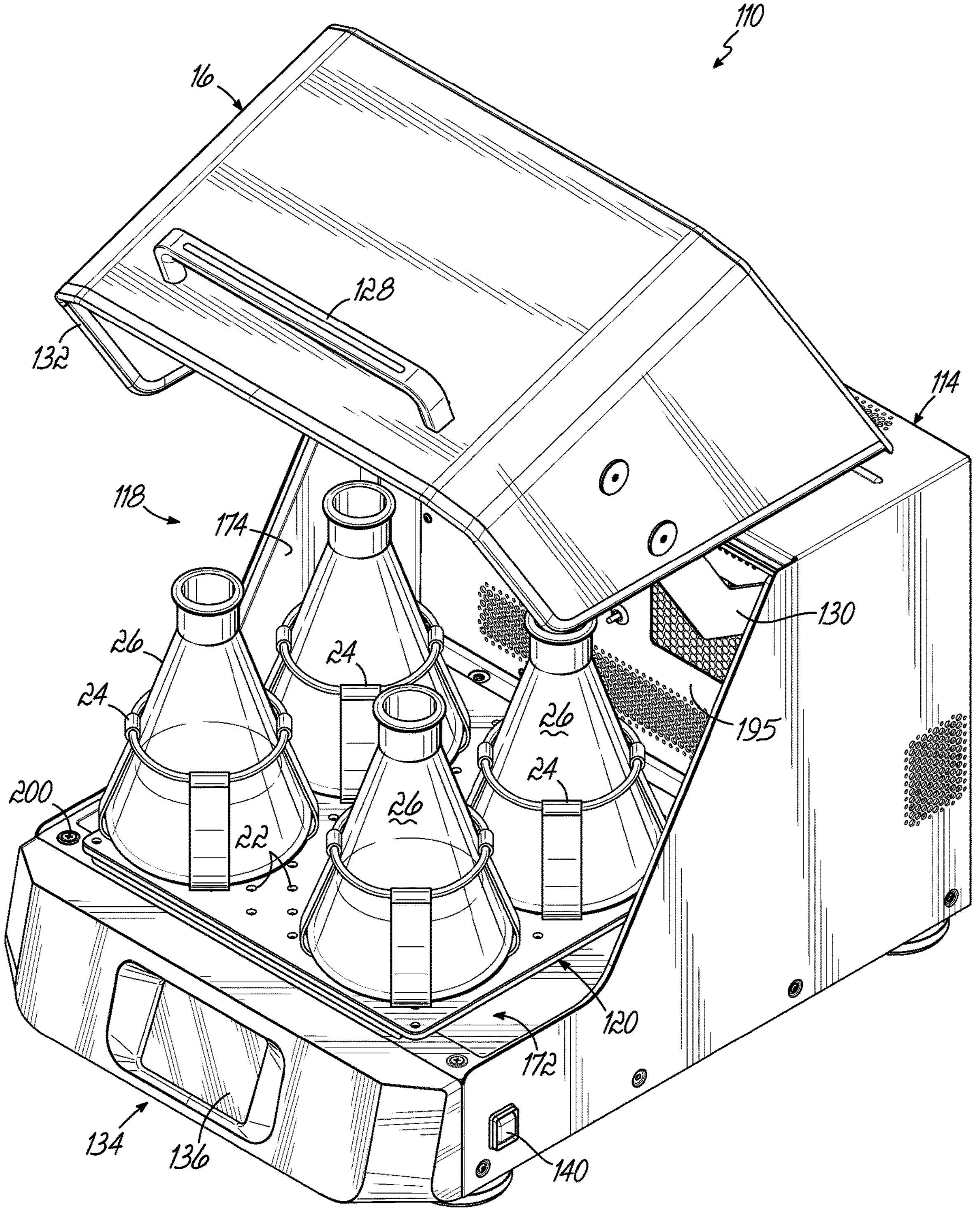
FIG. 9 is a perspective view of an incubated shaker according to an alternative embodiment of the present invention.

In the closed position, the shaker 10 defines an incubated shaker chamber 18 that is enclosed within the housing assembly 14 and the pivotal cover 16. As shown in FIGS. 1-3, a shaker platform 20 is supported in the incubated chamber 18 and includes, in one embodiment, an array of threaded apertures or bores 22 (FIG. 2) that are configured to mount vessel supports, such as spring-biased clamps 24 as shown in FIGS. 2 and 9, via threaded fasteners (not shown) which extend downwardly from the clamps 22 and threadably engage with the threaded apertures 22 provided in the shaker platform 20. As shown in FIGS. 1 and 9, the spring-biased clamps 24 are configured to removably secure liquid containing vessels, such as the flasks 26 shown in the figures, to the platform 20 during a shaking process as will be described in greater detail below.

As those of ordinary skill in the art will appreciate, the vessels 26 supported within the incubated chamber 18 may comprise flasks, beakers, jars, test tubes and/or vials, or any other suitable vessel configured to contain liquid therein and commonly used with incubated shakers. Moreover, it will be appreciated that the construction of the shaker platform 20, and/or the vessel supports, such as the spring-biased clamps 24, may be modified as understood by those of ordinary skill in the art for a particular shaking application without departing from the spirit and scope of the present invention.

To move the pivotal cover 16 between the open position (FIG. 2) and the closed position (FIGS. 1 and 3), the cover 16 includes a handle 28 and a pair of opposite parallel linkages 30 that permit the cover 16 to be moved upwardly and downwardly by a user with the assistance of spring mechanisms (not shown). To ensure a proper seal when the cover 16 is moved into the closed position, a sealing gasket, such as a silicone gasket 32, is provided about a free peripheral edge of the cover 16, with the gasket 32 being configured to sealingly engage with opposing surfaces of the housing assembly 14 in the closed position.

In one embodiment, the incubated shaker 10 includes a front panel 34 having a user control display 36 that may be used by a user to set or program various parameters of the shaking process. The user control display 36 may comprise a flat panel touchscreen as shown in FIGS. 1-3, or any other suitable device, such as manual buttons or knobs, or a wireless communication, that is configured to receive the various setting parameters from the user. These setting parameters may include, by way of example and without limitation, the shaking speed (RPM), incubated shaker chamber temperature, and shaking duration of the shaking process.

Figure 5:
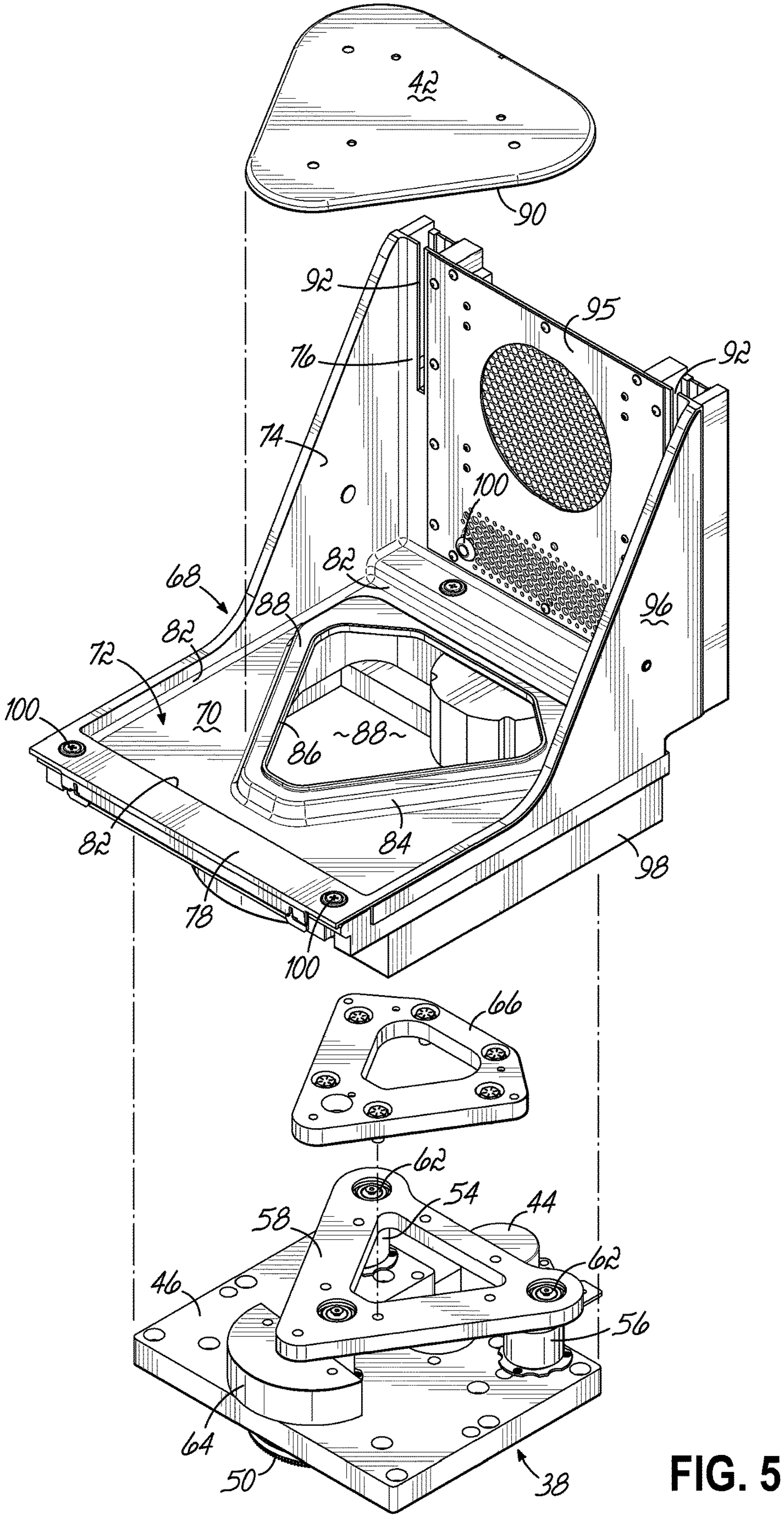
FIG. 5 is disassembled perspective view of the incubated shaker of FIG. 4.

In one embodiment, the shaker 10 includes a controller (not shown) that is electrically coupled to the user control display 36, a shaker mechanism 38 (FIGS. 3 and 5-8) that is supported in a lower portion of the housing assembly 14 as shown in FIG. 5, and a temperature control system (not shown) supported in a rear portion of the incubated shaker 10. The temperature control system (not shown) includes heating and/or cooling components (not shown) that operate according to the temperature parameter set by the user to maintain the incubated shaker chamber 18 at a desired temperature during the shaking process as will be described in greater detail below. A toggle power switch 40 (FIG. 1) is provided to control the supply of power to the incubated shaker 10 in a conventional manner.

Figure 4:
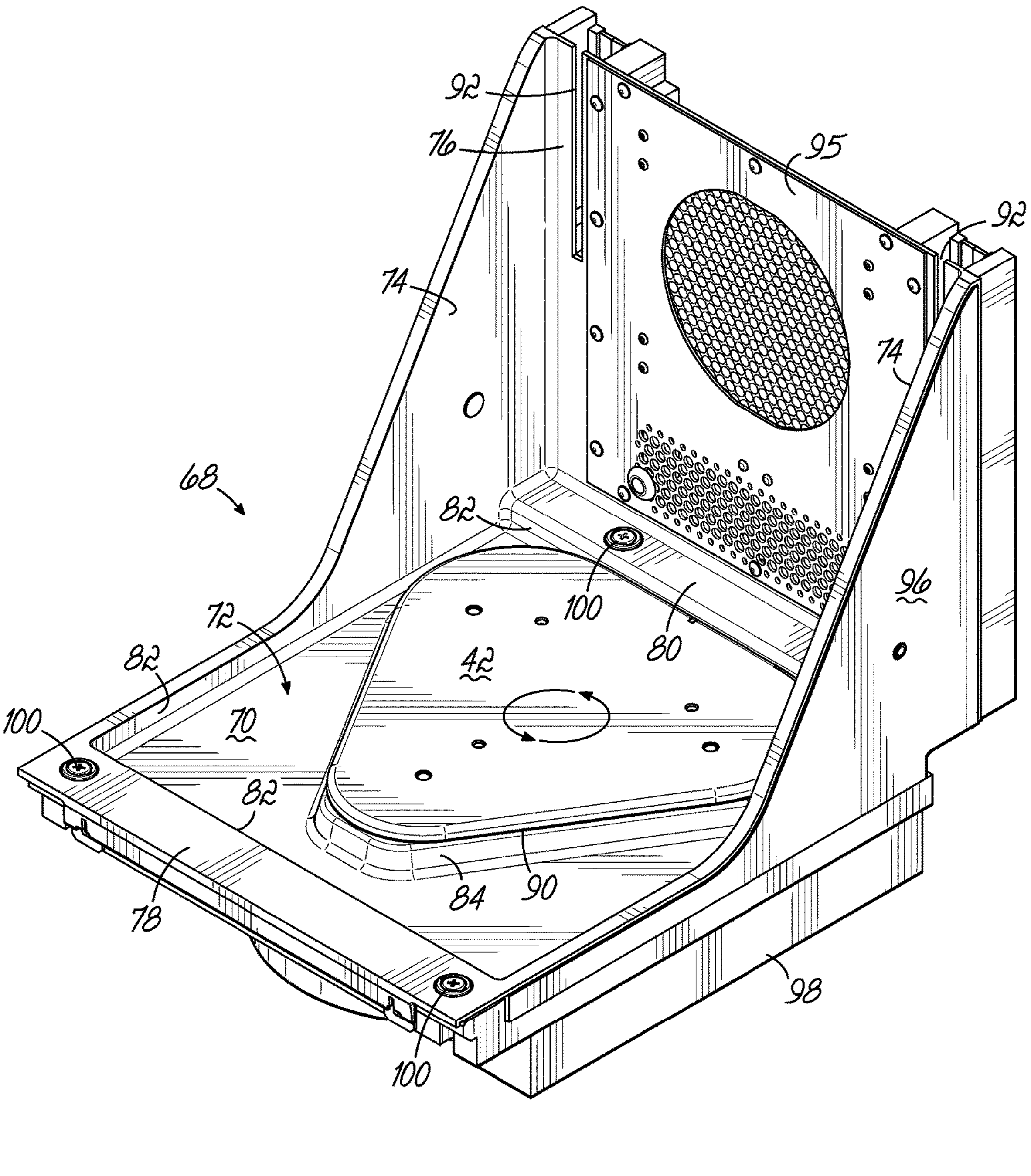
FIG. 4 is a view similar to FIG. 2 but with the shaker housing assembly, pivotal cover, and shaker platform removed, showing a spill tray of the shaker according to one embodiment of the present invention.

As shown in FIGS. 2-4, the shaker mechanism 38 is operatively coupled to a platform support 42 which is supported for orbital rotation within the incubated shaker chamber 18. The shaker mechanism 38 and the platform support 42 are operatively coupled together according to one embodiment by mechanical fasteners (not shown).

As shown in FIG. 3, the shaker platform 20 is mounted to the platform support 42 via mechanical fasteners (not shown), with the shaker platform 20 being located above, and at least partially, or alternatively completely, overlying the platform support 40. In this way, orbital rotation of the platform support 40 imparted by the shaker mechanism 38 causes a corresponding orbital rotation of the shaker platform 20, and the liquid-containing vessels 26 supported thereon, as will be described in greater detail below.

Figure 6:
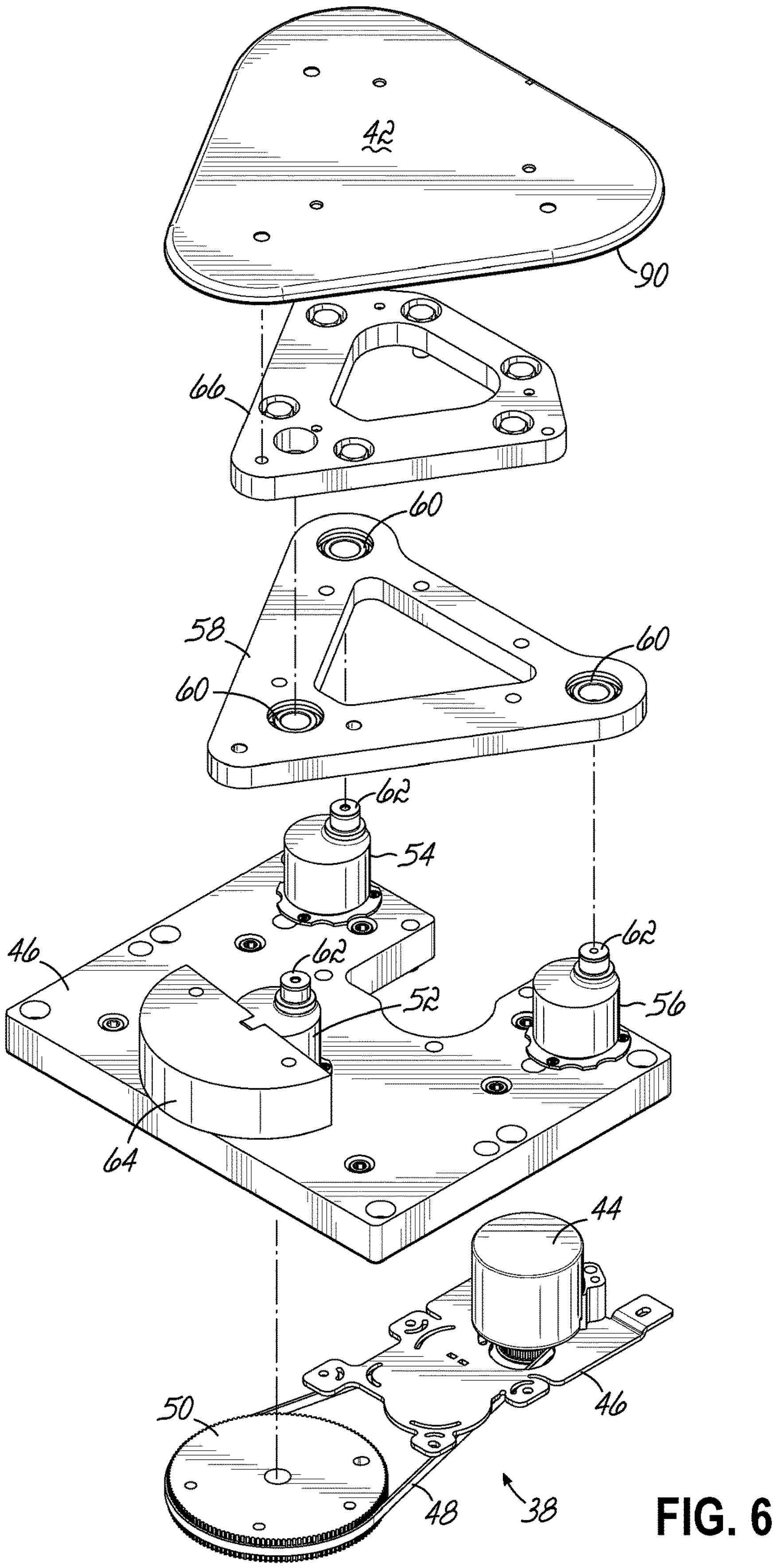
FIG. 6 is an exploded view of a shaker mechanism and a platform support according to one embodiment of the present invention.
Figure 7:
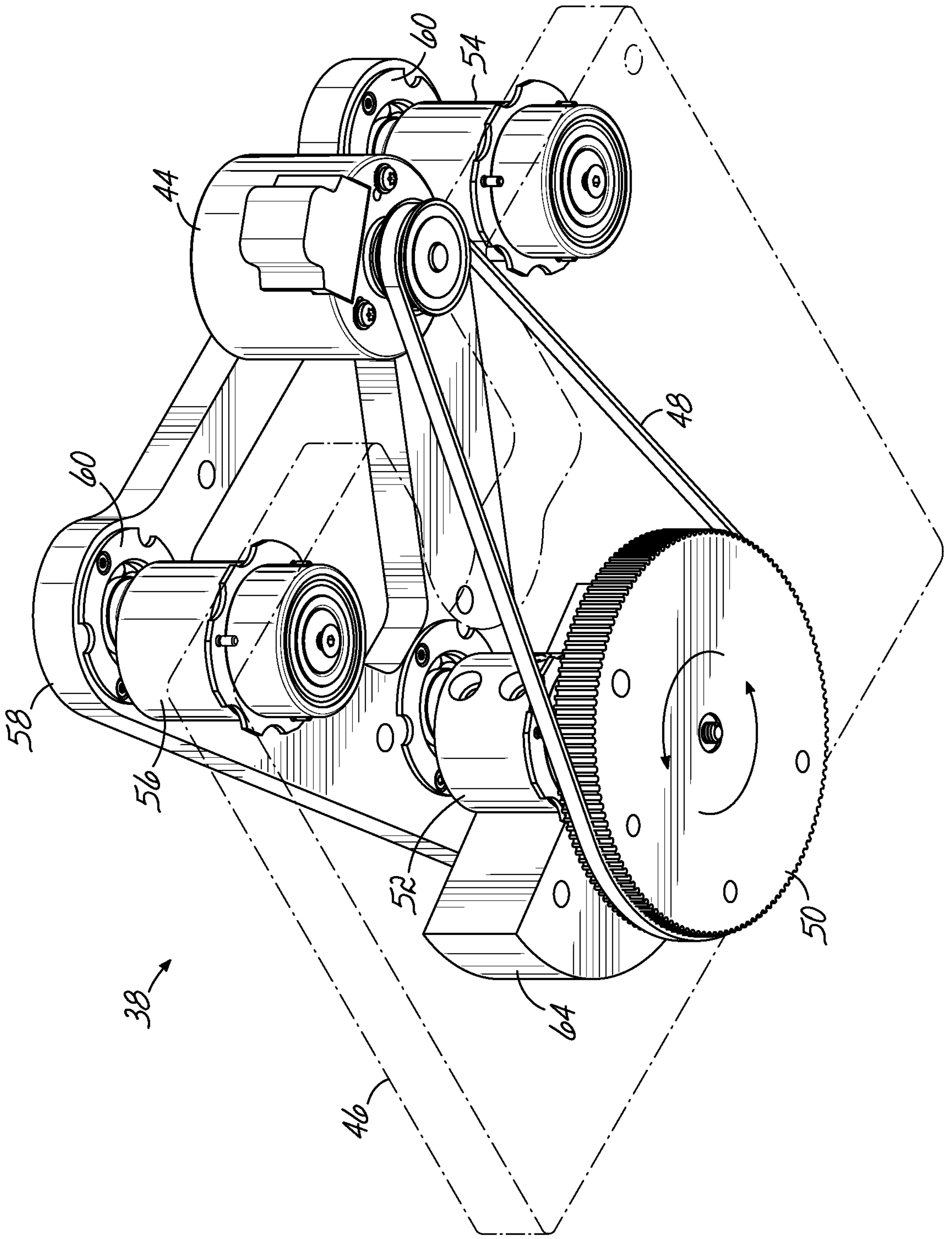
FIG. 7 is a bottom perspective view of the shaker mechanism shown in FIG. 6.

With specific reference to FIGS. 6 and 7, the exemplary shaker mechanism 38 includes a drive motor 44 secured to a motor mounting plate 46. The drive motor 44 engages with a toothed belt 48 that drives a gear 50 fixed to a central shaft of a primary eccentric bearing assembly 52. The primary eccentric bearing assembly 52 transfers its rotational movement to secondary eccentric bearing assemblies 54, 56 through a connection with a triangular linkage 58. The primary and secondary eccentric bearing assemblies 52, 54 and 56 attach to drive cylinder bearings 60 located on the triangular linkage 58 through posts 62 that are offset from an axis of rotation of the primary and secondary eccentric bearing assemblies 52, 54 and 56. Through this linkage, the primary and secondary eccentric bearing assemblies 52, 54 and 56 rotate in unison in response to operation of the drive motor 44. To reduce vibration in the shaker mechanism, a counterweight 64 is placed on the primary eccentric bearing assembly 52.

The rotational movement of the triangular linkage 58 is transferred to the platform support 42 through a connection with a spacer plate 66. The spacer plate 66 is fastened to both the platform support 42 and the triangular linkage 58 via fasteners (not shown). In alternative embodiments, the size of the spacer plate 66 may be adjusted to adapt to other incubated shaker models.

Figure 8A:
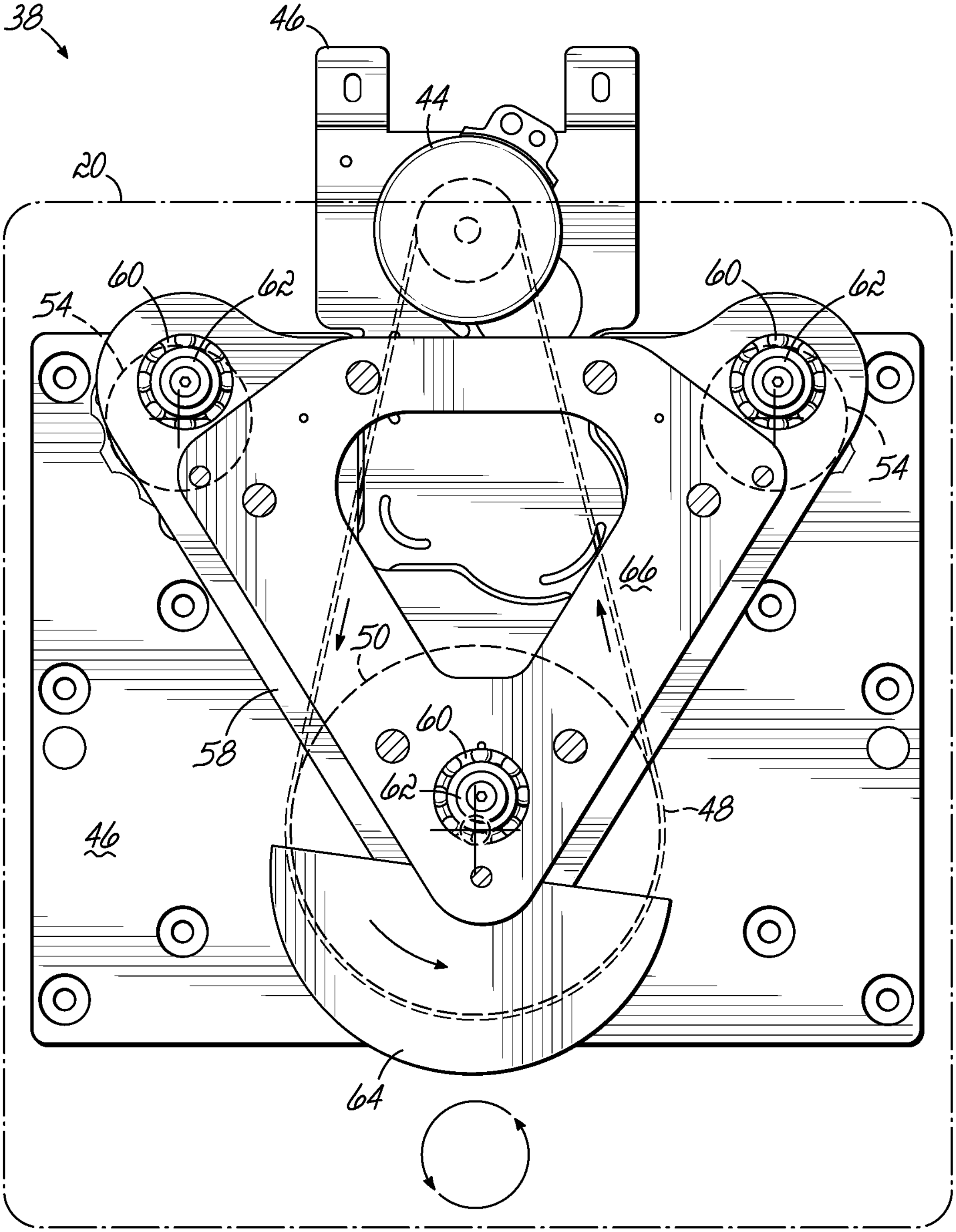
FIG. 8A is a bottom elevational view of the shaker mechanism shown in FIG. 7 with arrows indicating the direction of a belt of the shaker mechanism when driven by a motor.
Figure 8B:
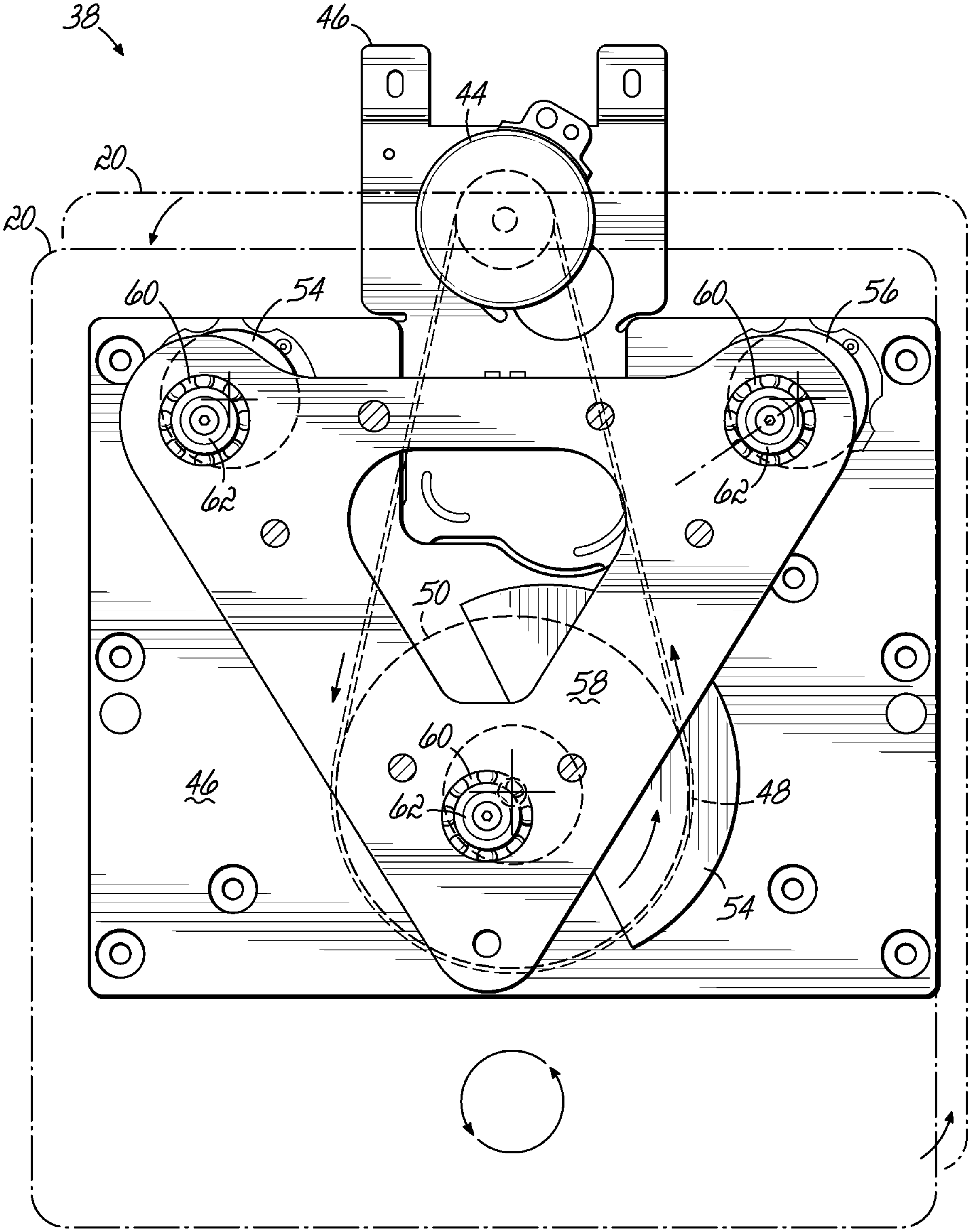
FIG. 8B is a view similar to FIG. 8A showing the shaker platform orbiting an incremental distance in a counterclockwise direction.
Figure 8C:
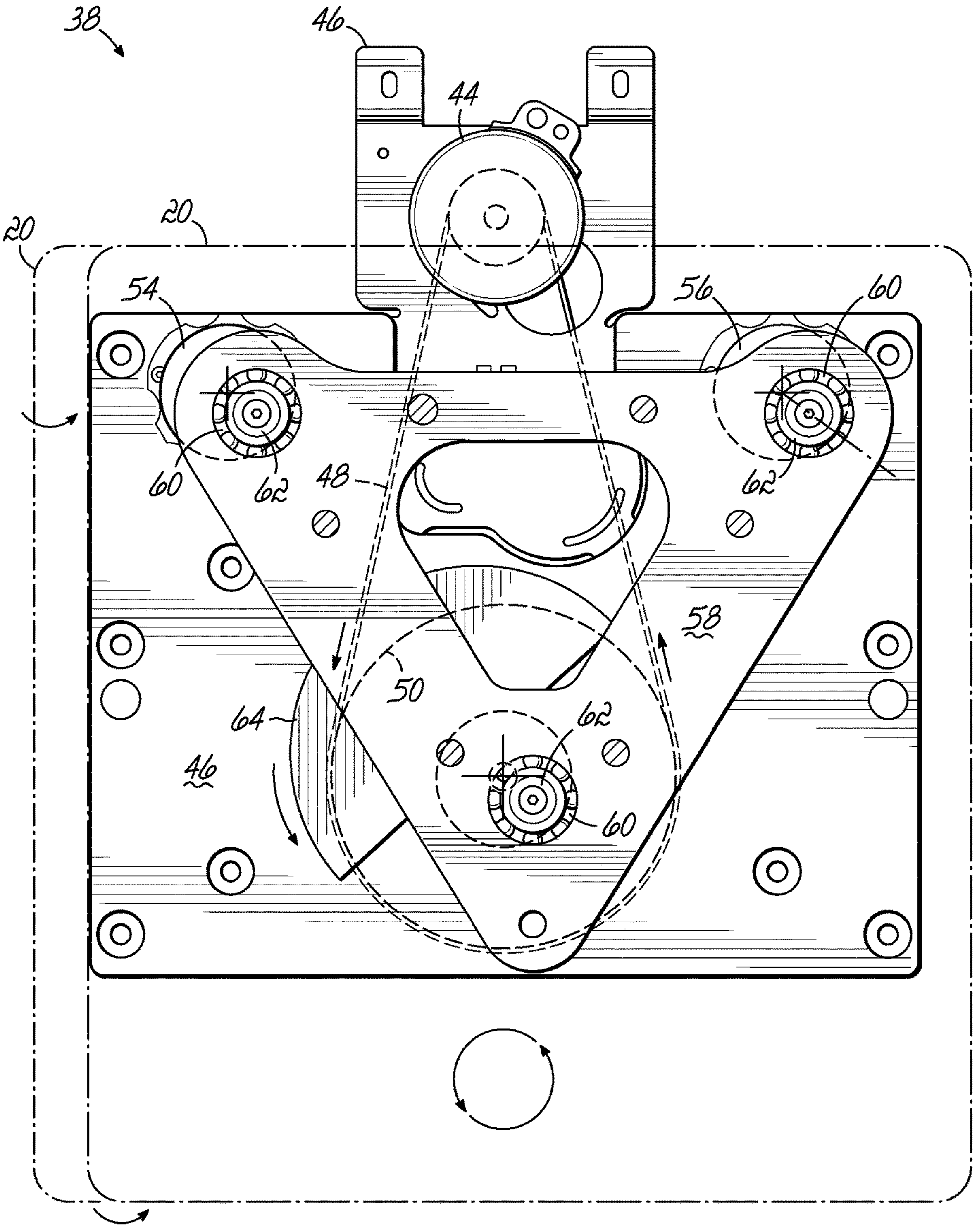
FIG. 8C is a view similar to FIG. 8B showing the shaker platform orbiting an additional incremental distance in the counterclockwise direction.

FIGS. 8A-8C demonstrate the rotational movement of the shaker mechanism 38 with respect to the shaker platform 20. As shown in FIG. 8A, the arrows indicate the direction of the belt 48 driving the shaker platform 20 in a counterclockwise direction. FIG. 8B is a view similar to FIG. 8A, with the shaker platform 20 rotating an incremental distance counterclockwise. In this view, the rotation of the counterweight 64, triangular linkage 58, and primary and secondary eccentric bearing assemblies 52, 54 and 56 can be seen. Likewise, FIG. 8C illustrates a view similar to FIG. 8B, with the shaker platform 20 rotating an additional incremental distance counterclockwise. In this way, orbital rotation of the shaker platform 20 is achieved by the shaker mechanism 38 that imparts a circular shaking motion to the vessels 26 so as to gently mix, blend, or agitate the liquids contained within the respective vessels 26.

During use of the incubated shaker 10, it is not uncommon for liquid to spill from one or more of the vessels 26 during a shaking operation which may be caused by the liquid overflowing from its vessel 26 while oscillating or rotating on the shaker platform 20. Liquid spillage within the incubated shaker 10 may also occur, for example, from a vessel 26 breaking or accidentally releasing from its clamp 24, or from mishandling of the vessel 26 while the shaker platform is at rest.

According to a principle aspect of the present invention, the incubated shaker 10 includes a spill tray 68 that is mounted within the incubated shaker chamber 18. The spill tray 68 may be optionally removable from the shaker 10 and be made of a corrosion-resistant metal or comprise a molded component made of suitable synthetic material, with the spill tray 68 being configured to contain the spilled liquid so as to prevent the spilled liquid from flooding the lower portion of the housing assembly 14 or contacting the shaker mechanism 38 or any electronics located within the incubated shaker 10.

Figure 5A:
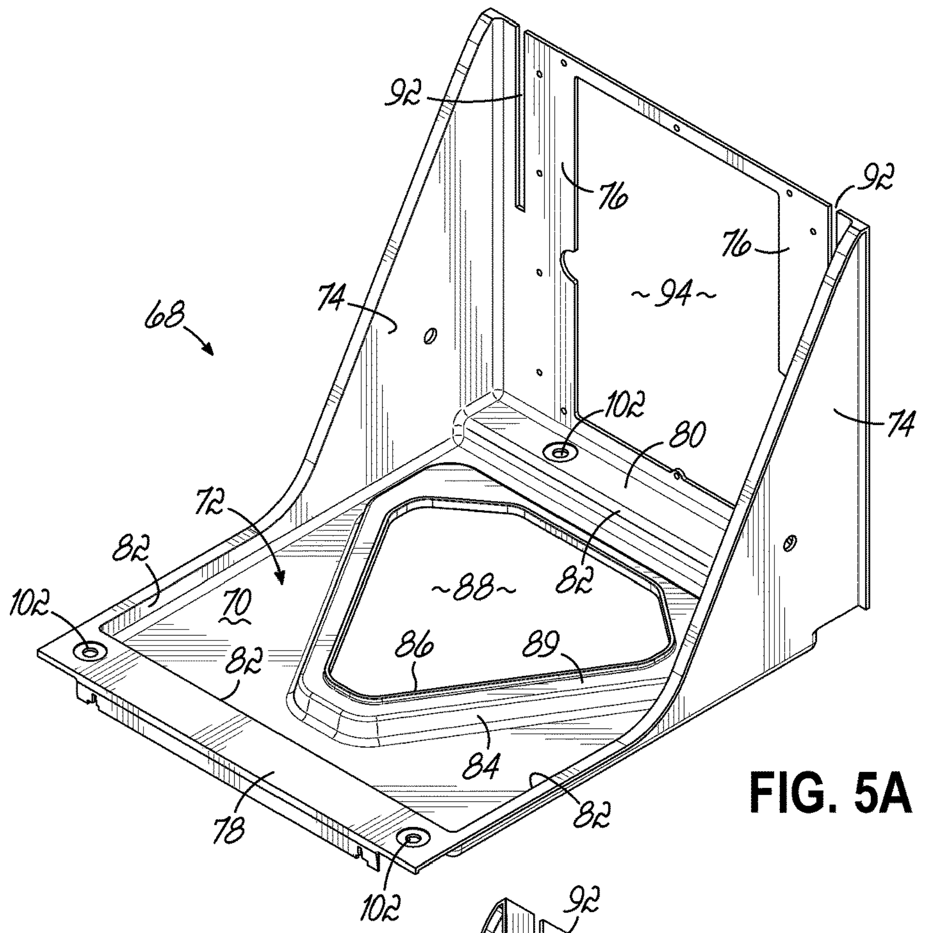
FIG. 5A is a perspective view of the spill tray according to an exemplary embodiment.
Figure 5B:
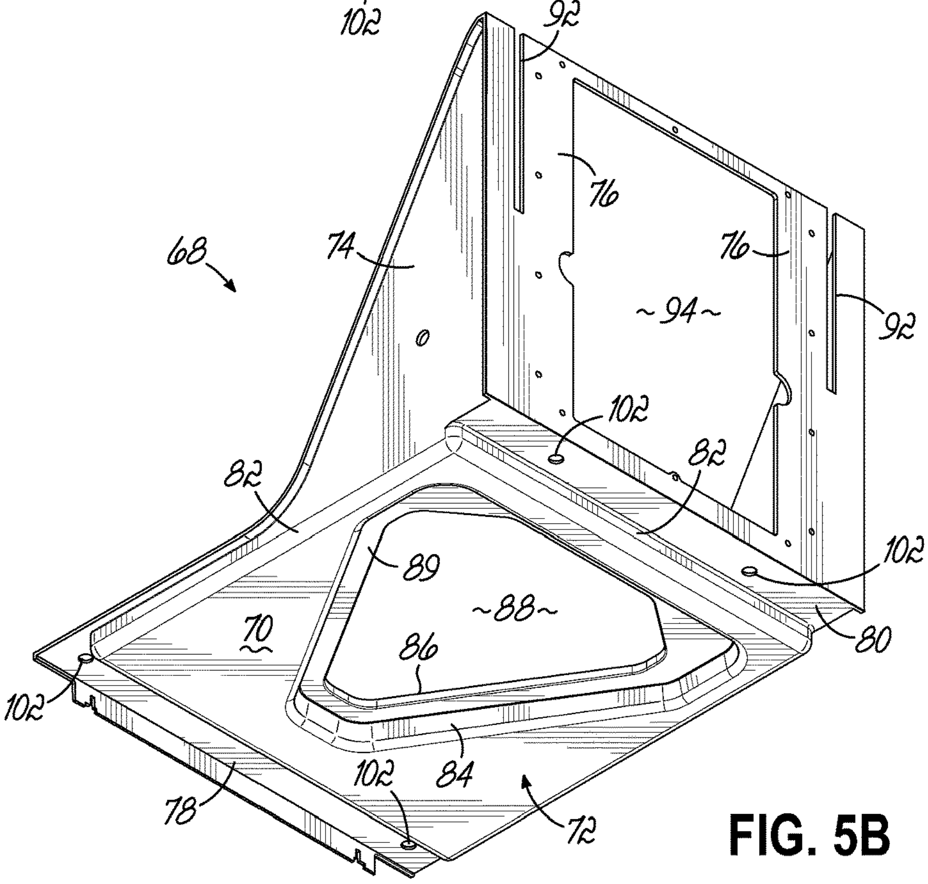
FIG. 5B is a view similar to FIG. 5A with portion of the spill tray side wall removed to show detail.

As best shown in FIGS. 5A and 5B, the spill tray 68 according to an exemplary embodiment includes a bottom wall 70 defining a base collecting area 72, a pair of opposing and parallel side walls 74, a rear wall 76, and front and rear mounting portions 78, 80. The base collecting area 72 serves as a reservoir for containing spills that may pass through the apertures 22 of the shaker platform 20, or other spills that may occur within the incubated shaker chamber 18. In one embodiment, the base collecting area 72 may receive and contain up to 250 ml of liquid. In an alternative embodiment, the base collecting area 38 may receive and contain upwards of 500 ml of liquid.

To prevent a spill from reaching the shaker mechanism 38, the base collecting area 72 comprises a concave depression or well (see FIG. 3) that is surrounded about its entire perimeter by a continuous upstanding wall portion 82. As shown in FIGS. 5A and 5B, the bottom wall 70 tapers upwardly into an upstanding boss 84 that includes a raised lip portion 86 defining an aperture 88 that extends through a top wall 89 of the boss 84. In one embodiment, the boss 84 is surrounded on all sides by the base collecting area 72 as shown in FIGS. 4 and 5. Alternatively, the boss 84 may be at least partially surrounded by the boss collecting area 72.

In one embodiment of the present invention, the aperture 88 is configured to permit operative connection of the shaker mechanism 38 with the shaker platform 20 through the aperture 88. In other words, mechanical connection of the shaker mechanism 38 with the shaker platform 20 is accommodated via the aperture 88. The aperture 88 provides an opening through which a mechanical connection of the shaker mechanism 38 with the shaker platform 20 may be achieved, as well as providing sufficient clearance for movement of the operative connection of the shaker mechanism 38 with the shaker platform 20 within the opening during the shaking process.

In one embodiment as shown in FIG. 3, the aperture 88 is sized and shaped, i.e., configured, to permit at least a portion of the shaker mechanism 38 to extend through the aperture 88, while also allowing the platform support 42 to extend over the entirety of the aperture 88. As shown in FIG. 3, a periphery of the platform support 42 includes a downturned lip 90 that extends beyond the periphery of the raised lip portion 86 defining the aperture 88 during the entire shaking movement of the shaker platform 20. In this way, the platform support 42 entirely overlies the aperture 88 during the entire shaking movement of the shaker platform 20. Alternatively, the platform support 42 may partially overlie the aperture 88 during the entire shaking movement of the shaker platform 20.

In the event that liquid spills onto the platform support 42, the downturned lip 90 of the platform support 42, in cooperation with both the upstanding boss 84 and the raised lip portion 86, helps to redirect the liquid into the base collecting area 72 and away from the aperture 88.

While a single aperture 88 is shown in FIGS. 3, 5A and 5B, it will be appreciated that more than one aperture may be provided that extend through the bottom wall 70 of the spill tray 68 and permit operative connection of the shaker mechanism 38 with the shaker platform 20.

In one embodiment, the side walls 74 of the spill tray 68 include angled portions extending generally from a mid-portion of the spill tray 68, and connecting with the rear wall 76. The side walls 74 allow the gasket 32 of the pivotal cover 16 to seal with opposing surfaces of the housing assembly 14. The rear wall 76 of the spill tray 68 includes a pair of open-ended, elongated slots 92 that allow for the movement of the parallel linkages 30 of the pivotal cover 16 as the pivotal cover 16 is moved between the open and closed positions.

The rear wall 76 further includes an opening 94 that is sized to be covered by a venting panel 95 secured to the rear wall 76 that allows for the transfer of conditioned air (heated or cooled) from the temperature control system (not shown) into and out of the incubated shaker chamber 18. To aid in temperature regulation, the spill tray 68 may include insulation trays 96 attached to the side walls 74. Additionally, a base insulating portion 98 may be attached beneath the spill tray 68 via fasteners 100 that are secured through apertures 102 provided in the front and rear mounting portions 78, 80 of the spill tray 68. In addition to temperature regulation, the base insulating portion 98 serves to mount the shaker mechanism 38 in place while reducing noise and mechanical vibrations emanating from the shaker mechanism 38.

In the event of a spill, the user may remove the shaker platform 20 by first unfastening the fasteners (not shown) used to secure the shaker platform 20 to the platform support 42.

With the shaker platform 20 separated from the platform support 42 and removed from the incubated shaker 10 as shown in FIG. 4, the user may wipe down the interior surfaces of the spill tray with a suitable cloth dampened with a noncorrosive cleanser or 70% ethanol, for example.

Should further access to the lower portion of the incubated shaker 10 be necessary, such as to access the shaker mechanism 38 and/or any internal electronics, the user may first unfasten the fasteners (not shown) used to secure the platform support 42 to shaker mechanism 38. Next, the user may remove the platform support 42 from the incubated shaker 10.

The spill tray 68 is advantageously removable from the incubated shaker 10 in one embodiment by the user first removing the fasteners 100 located at the front and rear mounting portions 78, 80 of the spill tray 68. With the spill tray 68 now unfastened from the housing assembly 14, the user may remove the spill tray 68 from the incubated shaker 10 to access the lower portion of the housing assembly 14 which was previously located beneath the bottom wall 70 of the spill tray 68. If necessary, the removed spill tray 68 may be conveniently sanitized by any suitable method outside of the incubated shaker 10.

Figure 10:
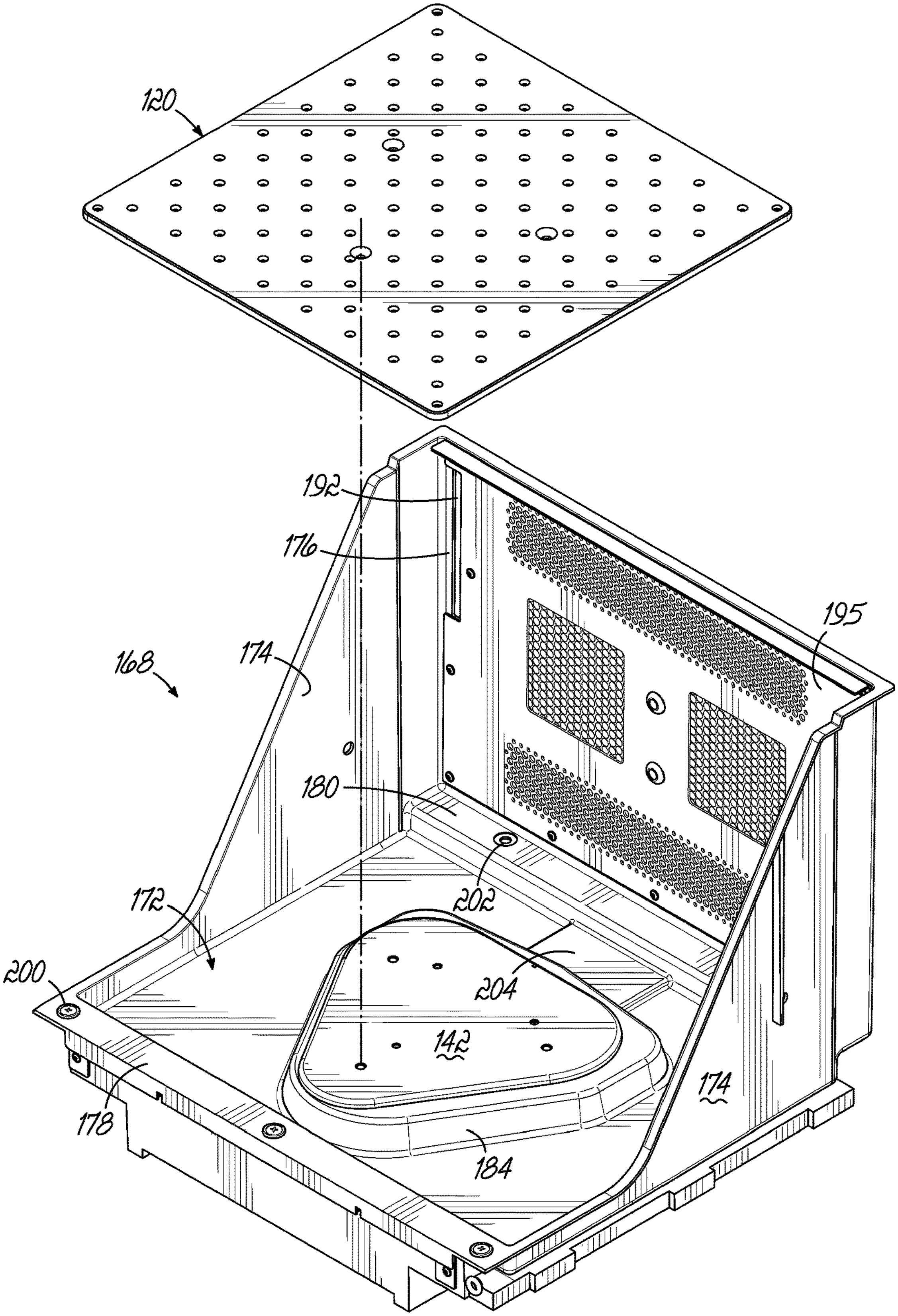
FIG. 10 is a disassembled perspective view of the incubated shaker of FIG. 9 with the shaker housing assembly and pivotal cover removed.
Figure 10A:
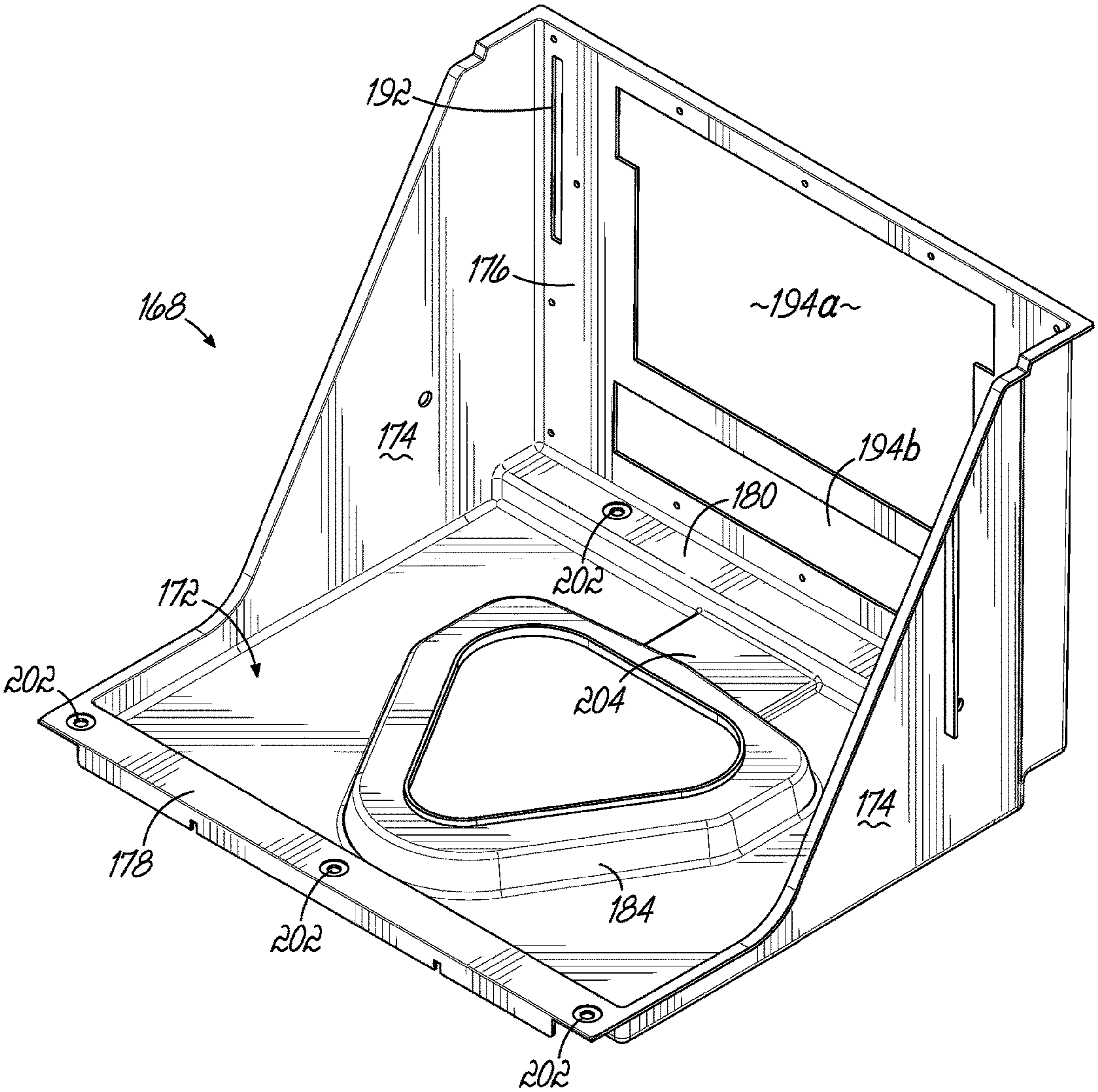
FIG. 10A is a perspective view of the spill tray shown in FIG. 10.

Turning now to FIGS. 9-10A, an incubated shaker 110 including a spill tray 112 is shown according to another embodiment of the present invention.

The incubated shaker 110 of this embodiment includes many of the same or similar elements as those previously described in connection with the embodiment of incubated shaker 10, and these elements have been provided with similar reference numbers in the "100" and "200" series where the elements are substantially the same or similar to the corresponding elements described in connection with incubated shaker 10

For example, the incubated shaker 110 of this embodiment includes a housing assembly 114, a pivotal cover 116, a front panel 134, a user control display 136, a power switch 140, an incubating shaker chamber 118, a handle 128, a pair of parallel linkages 130, a silicon gasket 132, a shaker platform 138, a platform support 142, and a shaker mechanism (not shown).

With reference to FIG. 10A, the spill tray 168 of this embodiment includes a base collecting area 172, side walls 174, a rear wall 176, front and rear mounting portions 178, 180, fasteners 200, and apertures 202. Although some of these elements have slightly modified shapes or profiles in this embodiment, the incubated shaker 110 and its elements function as described above except where the differences are outlined in further detail below (the detailed description of these identical or substantially similar elements is largely not repeated herein for the sake of brevity).

The primary differences in the incubated shakers 10 and 110 are as follows: the rear wall 176 of this embodiment now includes two separately defined openings 194*a*, 194*b* and a pair of closed-ended, elongated slots 192. Each of the openings 194*a*, 194*b* is sized to be covered by a venting panel 195 that allows for the transfer of conditioned air (heated or cooled) from a temperature control system (not shown) located in a rear portion of the incubated shaker 110 into and out of the incubated shaker chamber 118. The pair of the elongated slots 192 allow for the movement of the parallel linkages 130 when the pivotal cover 116 is moved between the open and closed positions.

In this embodiment, the base collecting area 172 of the spill tray 168 includes a raised portion 204 located proximate to a lateral midpoint of the base collecting area 138 that extends to the upstanding boss 184. This raised portion 204 helps to accommodate for the different structural design of the incubated shaker 110.

While an incubated laboratory shaker has been described herein according to an exemplary embodiment, it is contemplated that the spill tray of the present invention may be used with other types of laboratory shakers as well, such as a platform shaker, for example. The spill tray of the present invention may be used with a laboratory shaker that may not be incubated and/or the movement of the shaker platform may not be orbital, but rather the shaker platform may oscillate horizontally according to a non-orbital movement.

While the invention has been illustrated by various embodiments described in considerable detail, it is not the intention of the Applicant to restrict or limit the scope of the appended claims to such detail. Additional advantages and modifications will readily appear to those skilled in the art. The broader aspects of this invention are therefore not limited to the specific details, representative apparatus and method, and illustrative examples shown and described. Accordingly, departures may be made from such details without changing the spirit or scope of the Applicant's general inventive concept.

What is claimed is:

1. A laboratory shaker, comprising:

a shaker platform;

a shaker mechanism operatively connected to the shaker platform and being configured to oscillate the shaker platform and at least one liquid-containing vessel supported on the platform; and a spill tray located beneath the shaker platform and having at least one aperture extending through the spill tray and being configured to permit the operative connection of the shaker mechanism to the shaker platform through the aperture;

wherein the spill tray is configured to contain spilled liquid from the at least one liquid-containing vessel.

2. The laboratory shaker of claim 1, wherein the shaker mechanism is configured to oscillate in circular shaker motion.

3. The laboratory shaker of claim 1, further comprising:

an insulated shaker chamber, wherein the shaker platform and the spill tray are each located within the insulated shaker chamber.

4. The laboratory shaker of claim 1, further comprising:

a platform support operatively connected to the shaker mechanism, wherein the platform support is located beneath and operatively connected to the shaker platform.

5. The laboratory shaker of claim 4, wherein the platform support at least partially overlies the at least one aperture extending through the spill tray during oscillating movement of the shaker platform.

6. The laboratory shaker of claim 5, wherein the platform support entirely overlies the at least one aperture extending through the spill tray during oscillating movement of the shaker platform.

7. The laboratory shaker of claim 1, wherein the spill tray is removable from the laboratory shaker.

8. The laboratory shaker of claim 1, wherein the spill tray comprises a base collecting area configured to contain spilled liquid from the at least one liquid-containing vessel.

9. The laboratory shaker of claim 8, wherein the spill tray comprises:

a bottom wall defining the base collecting area; and an upstanding boss formed in the bottom wall of the spill tray and having a top wall, wherein the upstanding boss is at least partially surrounded by the base collecting area, and further wherein the at least one aperture extends through the top wall of the upstanding boss.

10. The laboratory shaker of claim 9, wherein the upstanding boss includes a raised lip portion that defines the at least one aperture extending through the top wall of the upstanding boss.

11. A laboratory shaker, comprising:

an insulated shaker chamber, a shaker platform located within the insulated shaker chamber;

a shaker mechanism operatively connected to the shaker platform and being configured to oscillate the shaker platform and at least one liquid-containing vessel supported on the platform;

a spill tray located within the insulated shaker chamber and beneath the shaker platform, the spill tray having at least one aperture extending through the spill tray and being configured to permit the operative connection of the shaker mechanism to the shaker platform through the aperture; and a platform support operatively connected to the shaker mechanism and located beneath and operatively connected to the shaker platform, wherein the spill tray is configured to contain spilled liquid from the at least one liquid-containing vessel.

12. The laboratory shaker of claim 11, wherein the platform support at least partially overlies the at least one aperture extending through the spill tray during oscillating movement of the shaker platform.

13. The laboratory shaker of claim 11, wherein the platform support entirely overlies the at least one aperture extending through the spill tray during oscillating movement of the shaker platform.

14. The laboratory shaker of claim 11, wherein the spill tray is removable from the laboratory shaker.

15. The laboratory shaker of claim 11, wherein the spill tray comprises a base collecting area configured to contain spilled liquid from the at least one liquid-containing vessel.

16. A spill tray for use in a laboratory shaker having a shaker platform and a shaker mechanism operatively connected to the shaker platform and being configured to oscillate the shaker platform and at least one liquid-containing vessel supported on the platform, the spill tray comprising:

a bottom wall defining a base collecting area;

an upstanding boss formed in the bottom wall of the spill tray and having a top wall; and at least one aperture extending through the top wall of the upstanding boss and being configured to permit operative connection of the shaker mechanism to the shaker platform through the aperture, wherein the spill tray is configured to contain spilled liquid from the at least one liquid-containing vessel.

17. The spill tray of claim 16, wherein the upstanding boss includes a raised lip portion that defines the at least one aperture extending through the top wall of the upstanding boss.

18. The spill tray of claim 16, wherein the upstanding boss is at least partially surrounded by the base collecting area.

* * * * *